(12) United States Patent
Koenekamp

(10) Patent No.: US 7,546,848 B2
(45) Date of Patent: Jun. 16, 2009

(54) CARTRIDGE VALVE WITH INTEGRATED CERAMIC RING HEATER

(75) Inventor: Andreas Koenekamp, Darmstadt (DE)

(73) Assignee: GM Global Technology Operations, Inc., Detroit, MI (US)

( * ) Notice: Subject to any disclaimer, the term of this patent is extended or adjusted under 35 U.S.C. 154(b) by 197 days.

(21) Appl. No.: 11/592,935

(22) Filed: Nov. 3, 2006

(65) Prior Publication Data

US 2008/0105843 A1   May 8, 2008

(51) Int. Cl.
*F16K 49/00* (2006.01)
*H01M 2/00* (2006.01)

(52) U.S. Cl. ......................... 137/341; 429/34
(58) Field of Classification Search ................ 137/334, 137/341; 429/34
See application file for complete search history.

(56) References Cited

U.S. PATENT DOCUMENTS

| | | | | |
|---|---|---|---|---|
| 2,324,337 A | * | 7/1943 | Jomsland | 137/341 |
| 2,777,463 A | * | 1/1957 | Boswell | 137/341 |
| 3,562,455 A | * | 2/1971 | McQueen | 137/341 |
| 3,915,193 A | * | 10/1975 | Rutt | 137/341 |
| 4,362,142 A | * | 12/1982 | Igashira et al. | 123/549 |
| 5,915,410 A | * | 6/1999 | Zajac | 137/341 |
| 6,060,691 A | * | 5/2000 | Minami et al. | 137/341 |
| 6,227,236 B1 | * | 5/2001 | Kusumoto et al. | 137/341 |
| 7,066,194 B2 | * | 6/2006 | Ku et al. | 137/341 |

* cited by examiner

*Primary Examiner*—John Fox

(57) ABSTRACT

A valve including an integrated heater that has particular application for one or more of a bleed valve, a drain valve and a pressure release valve in an anode outlet unit of a fuel cell system. The valve includes a valve body having a valve body chamber defining a valve seat. A valve tappet seats against the valve seat to close a flow channel in the valve through which a fluid flows. A ring heater is mounted within the chamber so that the fluid flows through a central opening in the ring heater, where the ring heater is in close proximity to the valve seat.

16 Claims, 2 Drawing Sheets

CARTRIDGE VALVE WITH INTEGRATED CERAMIC RING HEATER

BACKGROUND OF THE INVENTION

1. Field of the Invention

This invention relates generally to a heated valve and, more particularly, to a heated valve used in an anode outlet unit for a fuel cell system, where the valve includes a ceramic ring heater positioned proximate to a valve seat within a valve body.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated at the anode catalyst to generate free protons and electrons. The protons pass through the electrolyte to the cathode. The protons react with the oxygen and the electrons at the cathode catalyst to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are porous and thus allow nitrogen in the air from the cathode side of the stack to permeate therethrough and collect in the anode side of the stack, referred to in the industry as nitrogen cross-over. Nitrogen in the anode side of the fuel cell stack dilutes the hydrogen concentration such that if the nitrogen concentration increases beyond a certain percentage, such as 50%, the fuel cell stack may become unstable and may fail. It is known in the art to provide a bleed valve at the anode gas output of the fuel cell stack that is periodically opened to remove the nitrogen from the anode side of the stack.

As discussed above, it is necessary to periodically bleed the anode exhaust gas because of nitrogen accumulation in the anode side of the fuel cell stack. However, when the anode exhaust gas is bled, hydrogen is also included in the anode exhaust gas that could present a combustion problem outside of the fuel cell system. Therefore, it is known in the art to combine the anode exhaust gas with the cathode exhaust gas to reduce the concentration of exhausted hydrogen below a combustible level. Control models are known in the art to determine how much hydrogen is in the bled anode exhaust gas. Particularly, these algorithms know the pressure difference across the fuel cell stack and the flow of the anode exhaust gas through the bleed valve orifice, which can be used to determine the concentration of hydrogen. However, if significant water and water vapor exists within the anode exhaust gas, then the flow characteristics of the gas through the bleed valve are not able to be accurately determined. Thus, it is necessary to separate the water and water vapor from the anode exhaust gas before it is bled through the bleed valve.

SUMMARY OF THE INVENTION

In accordance with the teachings of the present invention, a valve including an integrated heater is disclosed that has particular application for one or more of a bleed valve, a drain valve and a pressure release valve in an anode outlet unit of a fuel cell system. The valve includes a valve body having a valve body chamber defining a valve seat. A valve tappet seats against the valve seat to close a flow channel in the valve through which a fluid flows. A ring heater is mounted within the chamber so that the fluid flows through a central opening in the ring heater, where the ring heater is in close proximity to the valve seat.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a valve including an integrated ring heater is merely exemplary in nature, and is in no way intended to limit the invention or its applications or uses. For example, the valve of the invention has particular application for one or more of a bleed valve, a pressure release valve and a drain valve in an anode outlet unit of a fuel cell system. However, as will be appreciated by those skilled in the art, the valve of the invention may have other uses for other applications.

Figure 1:
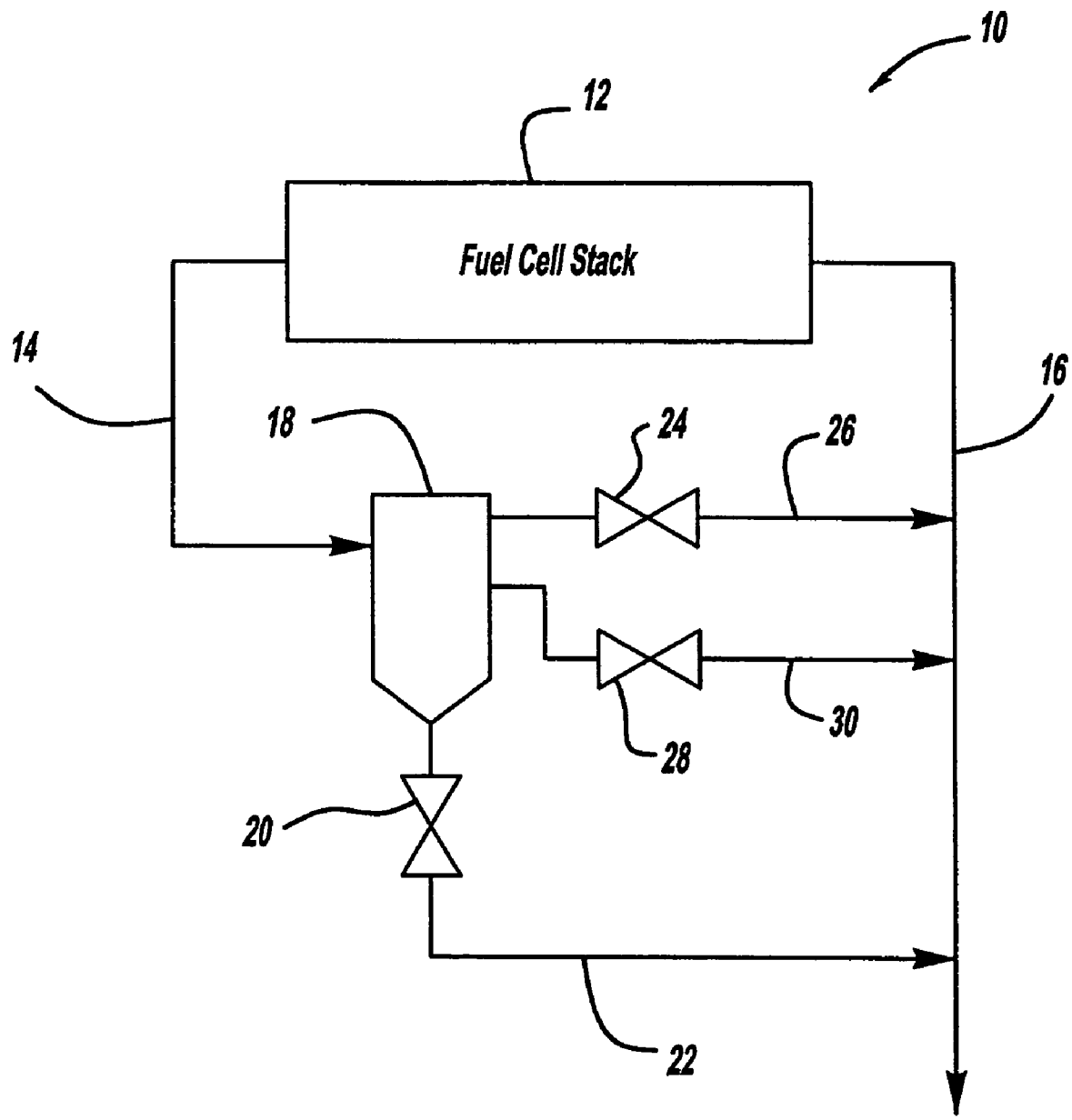
FIG. 1 is a simplified plan view of an anode outlet unit for a fuel cell system including a bleed valve, a pressure release valve and a drain valve.

In one known fuel cell system design, an anode outlet unit is provided that includes several valves for controlling the flow of the anode exhaust gas from the fuel cell stack. In order to illustrate this, FIG. 1 is a general plan view of part of a fuel cell system 10 including a fuel cell stack 12. An anode exhaust gas is output from the fuel cell stack 12 on an anode output line 14 and a cathode exhaust gas is output from the fuel cell stack 12 on a cathode exhaust gas line 16. As mentioned above, water is a by-product of fuel cell stack operation. Therefore, water is output from the fuel cell stack 12 through both the anode exhaust gas line 14 and the cathode exhaust gas line 16.

The system 10 also includes a water separator 18 having a level indicator. The water separator 18 separates water and water vapor from the anode exhaust gas and collects it within a water trap in the water separator 18. Once the level indicator indicates that the water level in the water trap reaches a predetermined level, a drain valve 20 is opened to drain the collected water on line 22, which is mixed with the cathode exhaust gas on the line 16. The gas flowing through the water separator 18 is periodically bled on line 26 to the cathode exhaust gas line 16 through a bleed valve 24.

The anode outlet unit also includes a pressure release valve 28 that is opened to release the anode exhaust gas to the cathode output line 16 on line 30 during those times when the pressure on the cathode side of the fuel cell stack 12 goes down significantly, but the bleed valve 24 is not open because an anode exhaust gas bleed is not commanded. For example, the compressor that provides the cathode inlet air to the fuel cell stack 12 may be suddenly reduced in speed or stopped during system operation. Because the hydrogen is not being consumed on the anode side of the stack 12 during these times, there is a relatively large pressure differential between the anode side and the cathode side of the fuel cell stack 12 that could cause damage to the membrane in the fuel cells. Also, the orifice in the bleed valve 24 may not be large enough to provide pressure release.

Figure 2:
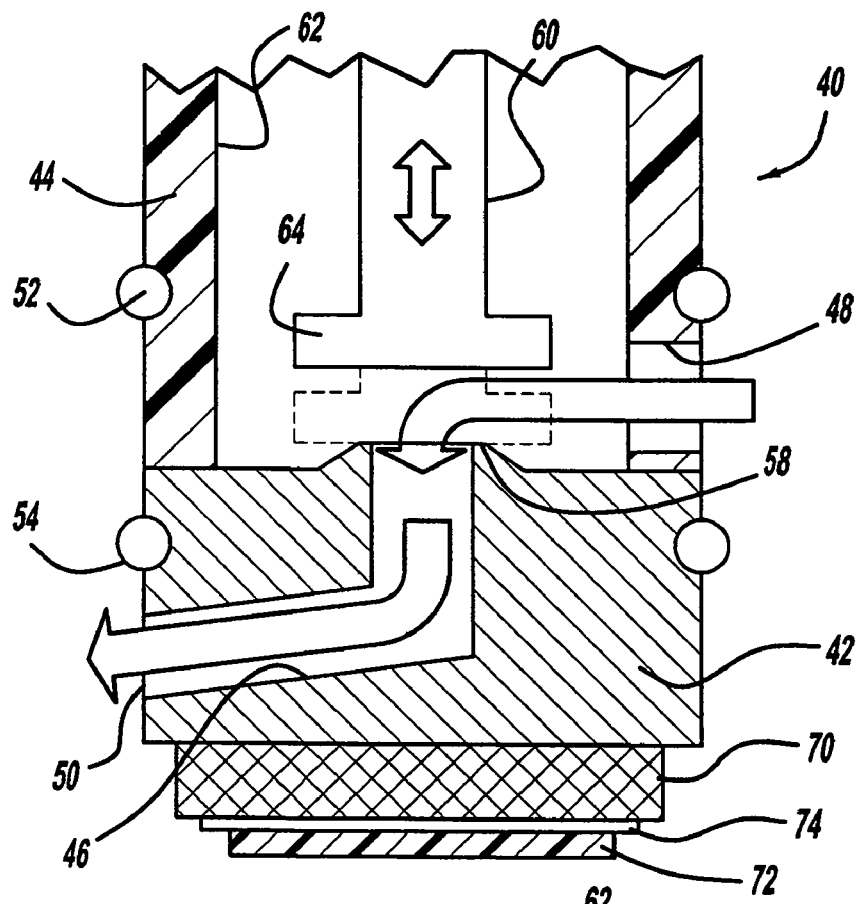
FIG. 2 is a broken-away, cross-sectional view of a known valve that can be used for one or more of the bleed valve, the pressure relief valve and the drain valve shown in FIG. 1.

FIG. 2 is a broken-away cross-sectional view of an electromagnetic control valve 40 that can be used for any of the valves 20, 24 or 28 described above. The valve 40 includes a cylindrical valve body 42, typically made of a metal, such as stainless steel, and a cylindrical valve housing 44, typically made of a suitable plastic. A flow channel 46 extends through the valve body 42 and the valve housing 44. An inlet opening 48 is provided in the valve housing 44 for receiving the fluid and an outlet opening 50 is provided in the valve body 42 through which the fluid exits the valve 40. O-rings 52 and 54 seal the flow channels outside of the valve 40. The valve body 42 includes an annular valve seat 58. A valve tappet 60 moves up and down within a valve housing chamber 62 in the valve housing 44, and includes a seal portion 64 that seats against the valve seat 58 when the valve 40 is in the closed position. The valve 40 includes an electromagnetic coil (not shown) that is activated to lift the valve tappet 60 to open the flow channel 46. The valve 40 is a normally closed valve in that the seal portion 64 seats against the valve seat 58 by a suitable spring (not shown) when the coil is not energized.

As discussed above, water and water vapor typically flow through the valves 20, 24 and 28. Therefore, during freeze conditions, water remains within the valves 20, 24 and 28 that may freeze during sub-zero conditions, preventing the seal portion 64 from properly seating against the valve seat 58. Therefore, it is known in the art to heat the valves 20, 24 and 28 during freeze conditions so that any water remaining in the valves 20, 24 and 28 is melted before operation of the fuel cell system.

Currently, these types of valves are typically heated with uncontrolled, externally controlled or self-regulating positive temperature coefficient (PTC) ceramic heaters attached outside of the valves. Returning to FIG. 2, the valve 40 includes a ceramic plate heater 70 attached to a bottom surface of the valve body 42 by the force of a spring element 72. An electrical contact 74 is positioned between the plate heater 70 and the spring element 72, and provides electrical current to the heater 70 to generate the heat.

The design described above for the valve 40 has a number of drawbacks. For example, by positioning the plate heater 70 outside of the valve 40, additional packaging space is required. Further, because the heater 70 is relatively far away from the valve seat 58 and the seal portion 64, it takes a relatively long period of time for the valve 40 to heat up to the desired temperature to remove the ice during low temperature system start-up.

Figure 3:
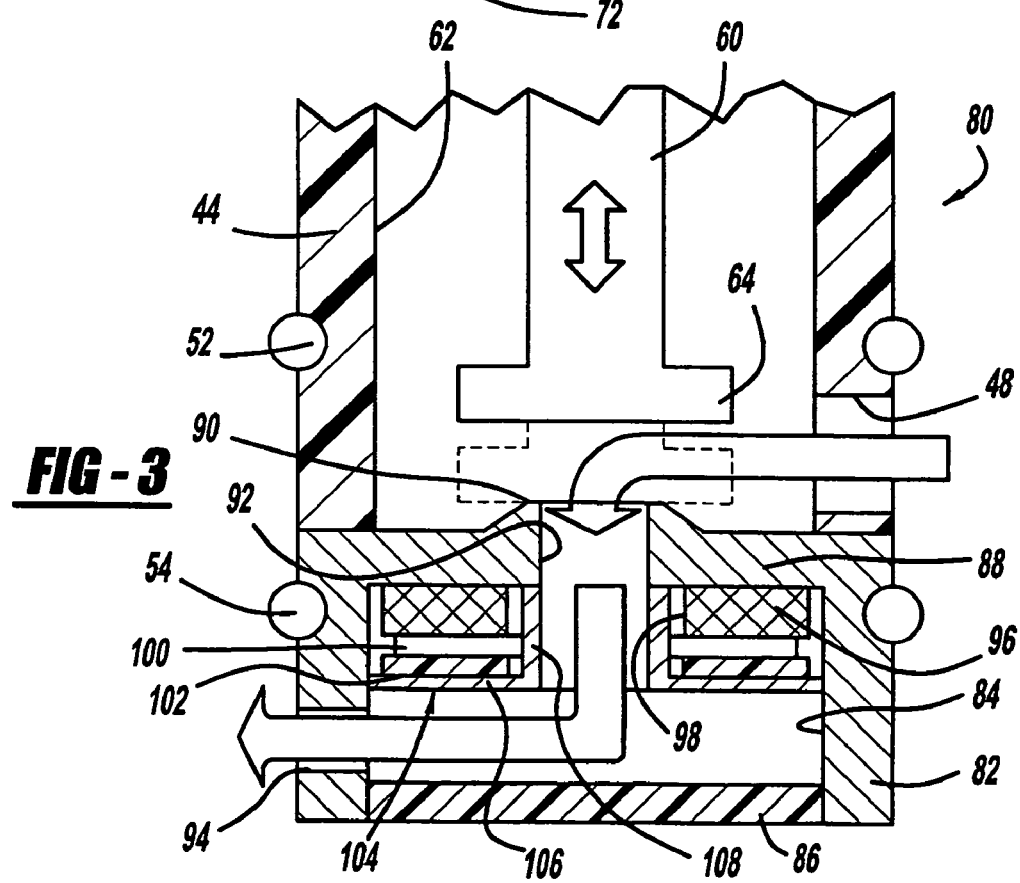
FIG. 3 is a broken-away, cross-sectional view of a valve, according to an embodiment of the present invention, that can be used for one or more the bleed valve, the pressure relief valve and the drain valve shown in FIG. 1.

FIG. 3 is a broken-away, cross-sectional view of an electromagnetic valve 80 that is similar to the valve 40, where like elements are identified by the same reference numeral. In the valve 80, the valve body 42 is replaced with a cylindrical valve body 82 that includes a valve body chamber 84 that is closed by a valve body cover 86. The valve body 82 can be made of any suitable thermally conductive material, such as a suitable metal, for example stainless steel. The valve body 82 includes an upper annular wall plate 88 that defines an annular valve seat 90. A central bore 92 extends through the plate 88 so that the chamber 84 is in fluid communication with the chamber 62 to provide a flow path between the inlet opening 48 and an outlet opening 94 in the valve body 82.

According to the invention, a ring heater element 96 is positioned against the wall 88 opposite to the chamber 62. The ring heater element 96 is an annular heater that has a central opening 98 that aligns with the bore 92. The ring heater element 96 can be any suitable heating element for the purposes discussed herein. In one non-limiting embodiment, the ring heater element 96 is a ceramic PTC ring heater element that is designed to provide a desirable maximum temperature, such as 60° C. As is known in the art, PTC heaters do not need to be self-regulated, and thus will not require various control components, such as temperature sensors. PTC ceramic heaters include a ceramic material that is designed for a particular temperature depending on the particular application. An electrical current is applied to the ceramic heater that generates heat as long as the temperature of the ceramic heater is below the designed temperature. If the ceramic heater reaches the designed temperature, then the resistance of the ceramic material goes up, and the current through the ceramic material goes down, so that the heater does not provide additional heating.

An annular electrical contact 100 is positioned in contact with the ring heater element 96 and a spring element 102 is positioned against the electrical contact 100. A heater cover 104 having a annular wall 106 and a cylindrical portion 108 is mounted within the chamber 84 and allows the spring element 102 to push against the ring heater element 96 against the wall plate 88. Therefore, a significant amount of surface area of the wall plate 88 is heated when the ring heater element 96 is operational. Further, because the thermal mass of the valve body 82 is reduced because of the chamber 84, the time that it takes the ring heater element 96 to raise the temperature of the valve 80 to the desired temperature is significantly reduced.

Although the PTC ring heater element 96 provides a number of advantages in this application because it does not need to be regulated, other ring heaters can also be employed that may not be PTC self-regulating type ring heaters. However, these heaters may require temperature sensors and other types of control.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A valve comprising:
a valve housing including a valve housing chamber;
a valve tappet positioned within the valve housing chamber;
a valve body including a valve body chamber and a wall plate, said wall plate including an opening therethrough and a valve seat provided around the opening, said valve tappet being moveable to be in contact with the valve seat to close the valve and move away from the valve seat to open the valve; and
a ring heater positioned within the valve body chamber in contact with the wall plate, said ring heater including an opening that aligns with the opening in the wall plate, said ring heater heating the wall plate to heat the valve seat, wherein the ring heater is outside of and not enclosed by the wall plate, said ring heater being part of a heater assembly including an annular electrical contact in contact with the ring heater and having an opening that aligns with the opening in the wall plate, a spring element positioned against the electrical contact that pushes the ring heater a against the wall plate and a heater cover that encloses the spring element, the electrical contact and the ring heater, said heater cover including a cylindrical portion that extends into the opening in the ring heater.

2. The valve according to claim 1 wherein the ring heater is a ceramic heater.

3. The valve according to claim 2 wherein the ring heater is a positive temperature coefficient ceramic heater.

4. The valve according to claim 1 wherein the valve housing includes an inlet opening in fluid communication with the valve housing chamber and the valve body includes an outlet opening in fluid communication with the valve body chamber to provide a flow channel through the valve.

5. The valve according to claim 1 wherein the valve body is made of stainless steel.

6. The valve according to claim 1 wherein the valve is part of an anode outlet unit in a fuel cell system.

7. The valve according to claim 6 wherein the valve is selected from the group consisting of anode exhaust gas bleed valves, anode exhaust gas pressure release valves and anode exhaust gas drain valves.

8. A valve for an anode outlet unit of a fuel cell system, said valve comprising:
a valve housing including a valve housing chamber;
a valve tappet positioned within the valve housing chamber;
a valve body including a valve body chamber and an annular wall plate, said wall plate including a central opening therethrough and a valve seat around the opening, said valve tappet being moveable to be in contact with the valve seat to close the valve and move away from the valve seat to open the valve; and
a positive temperature coefficient ceramic ring heater positioned within the valve body chamber in contact with the wall plate, said ring heater including a central opening that aligns with the opening in the wall plate, said ring heater heating the wall to heat the valve seat, wherein the ring heater is outside of and not enclosed by the wall plate, said ring heater being part of a heater assembly including an annular electrical contact in contact with the ring heater and having an opening that aligns with the opening in the wall plate, a spring element positioned against the electrical contact that pushes the ring heater against the wall plate and a heater cover that encloses the spring element, the electrical contact and the ring heater, said heater cover including a cylindrical portion that extends into the opening in the ring heater.

9. The valve according to claim 8 wherein the valve housing includes an inlet opening in fluid communication with the valve housing chamber and the valve body includes an outlet opening in fluid communication with the valve body chamber to provide a flow channel through the valve.

10. The valve according to claim 8 wherein the valve body is made of stainless steel.

11. The valve according to claim 8 wherein the valve is selected from the group consisting of anode exhaust gas bleed valves, anode exhaust gas pressure release valves and anode exhaust gas drain valves.

12. A valve comprising:
a valve body including a valve body chamber and a wall plate, said wall plate including an opening therethrough and a valve seat provided around the opening; and
a ring heater positioned within the valve body chamber in contact with the wall plate, said ring heater including an opening that aligns with the opening in the wall plate, said ring heater heating the wall plate to heat the valve seat, wherein the ring heater is outside of and not enclosed by the wall plate, said ring heater being part of a heater assembly including an annular electrical contact in contact with the ring heater and having an opening that aligns with the opening in the wall plate, a spring element positioned against the electrical contact that pushes the ring heater against the wall plate and a heater cover that encloses the spring element, the electrical contact and the ring heater, said heater cover including a cylindrical portion that extends into the opening in the ring heater.

13. The valve according to claim 12 wherein the ring heater is a ceramic heater.

14. The valve according to claim 13 wherein the ring heater is a positive temperature coefficient ceramic heater.

15. The valve according to claim 12 wherein the valve is part of an anode outlet unit in a fuel cell system.

16. The valve according to claim 15 wherein the valve is selected from the group consisting of anode exhaust gas bleed valves, anode exhaust gas pressure release valves and anode exhaust gas drain valves.

* * * * *